(12) United States Patent
Uchida et al.

(10) Patent No.: US 8,042,679 B2
(45) Date of Patent: Oct. 25, 2011

(54) BELT CLEANER

(75) Inventors: Masahiro Uchida, Tokyo (JP);
Nobuyoshi Fujisaki, Tokyo (JP)

(73) Assignee: Nippon Tsusho Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/706,870

(22) Filed: Feb. 17, 2010

(65) Prior Publication Data
US 2010/0219045 A1 Sep. 2, 2010

(30) Foreign Application Priority Data
Mar. 2, 2009 (JP) .................... 2009-047576

(51) Int. Cl.
*B65G 45/16* (2006.01)
(52) U.S. Cl. ....................................... 198/499
(58) Field of Classification Search ............... 198/497, 198/499
See application file for complete search history.

(56) References Cited

U.S. PATENT DOCUMENTS

| | | | | |
|---|---|---|---|---|
| 4,836,356 A | * | 6/1989 | Mukai et al. ............... | 198/499 |
| 5,845,761 A | * | 12/1998 | Davidts et al. ............. | 198/499 |
| 6,820,734 B1 | * | 11/2004 | Gilbert et al. ............. | 198/499 |
| 7,677,385 B2 | | 3/2010 | Gaarden et al. | |
| 2007/0272518 A1 | * | 11/2007 | Gaarden et al. ............ | 198/499 |
| 2009/0272625 A1 | * | 11/2009 | Devries et al. ............. | 198/499 |

FOREIGN PATENT DOCUMENTS

| | | |
|---|---|---|
| EP | 0 289 659 A1 | 11/1988 |
| EP | 0 338 118 A1 | 10/1989 |
| EP | 0 891 934 A1 | 1/1999 |
| JP | 5-65407 B2 | 9/1993 |
| JP | 7-2328 U | 1/1995 |
| JP | 7-20766 B2 | 3/1995 |

OTHER PUBLICATIONS

Japanese Office Action Mail Date Mar. 8, 2011 With English Translation.

* cited by examiner

*Primary Examiner* — James R Bidwell
(74) *Attorney, Agent, or Firm* — Roberts Mlotkowski Safran & Cole, P.C.; David S. Safran

(57) ABSTRACT

A belt cleaner is provided in which a scraping portion of a scraper becomes in contact with the belt surface over the full width thereof even when the trough-shape of the belt surface is different from the shape as expected, thereby the leavings on the belt surface will be scraped off in an optimum manner. The scraper is formed by a resiliently deformable blade which is curved and held in a holding groove of a holder so that the scraper (5) keeps an arcuate shape having a distance (L) between the central portion and the both side portions thereof with respect to the lengthwise direction of the belt. Shape shifting means (20) is provided in the holding groove (13) for transforming the scraper (5) into a desired curved configuration selected from among plural curved configurations changing the distance (L) thereby the scraper (5) is held in the selected curved configuration.

4 Claims, 13 Drawing Sheets

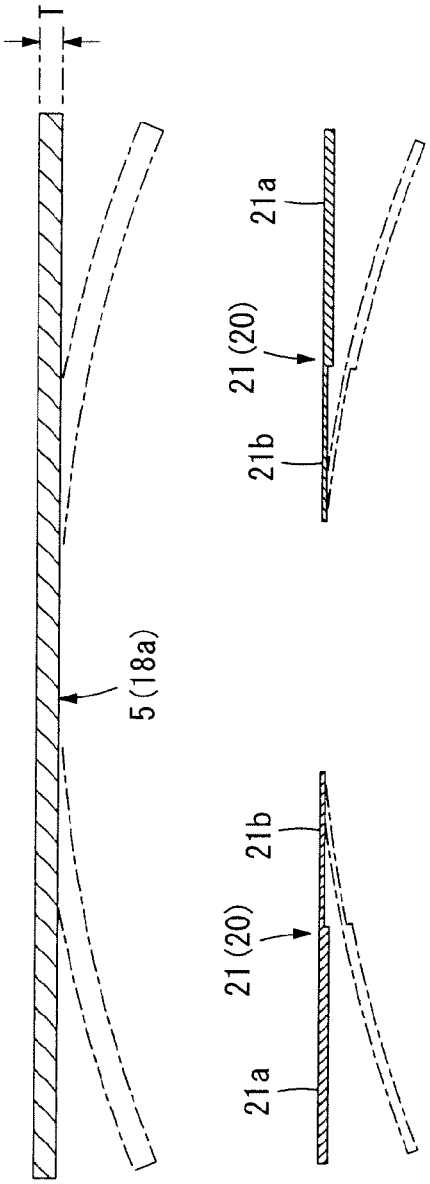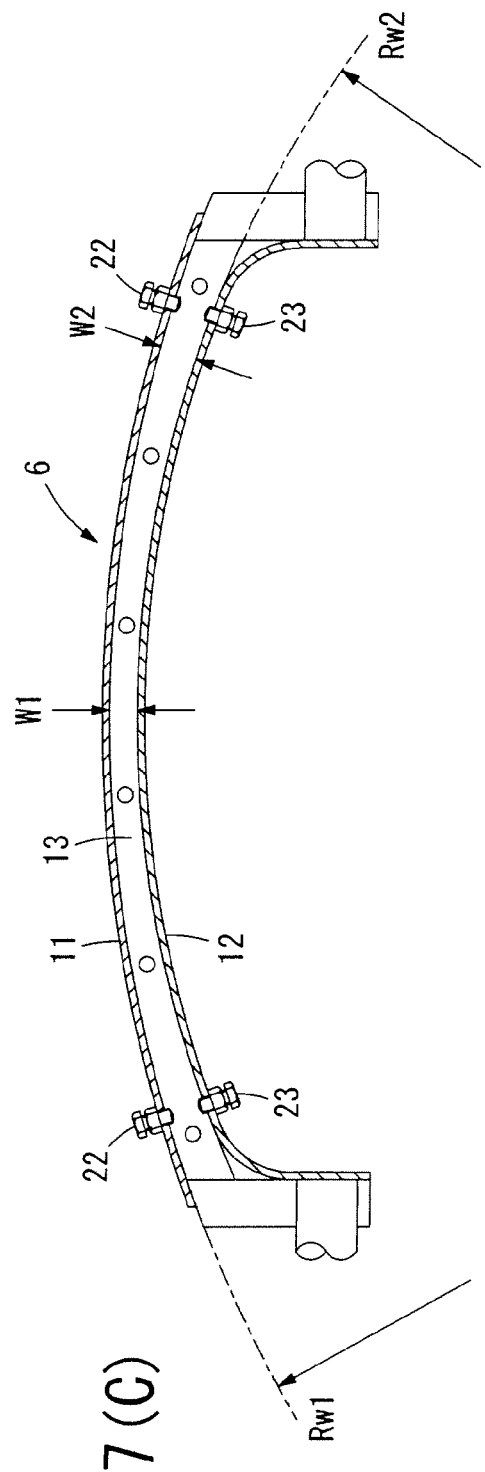
FIG. 7 (A)
FIG. 7 (B)
FIG. 7 (C)

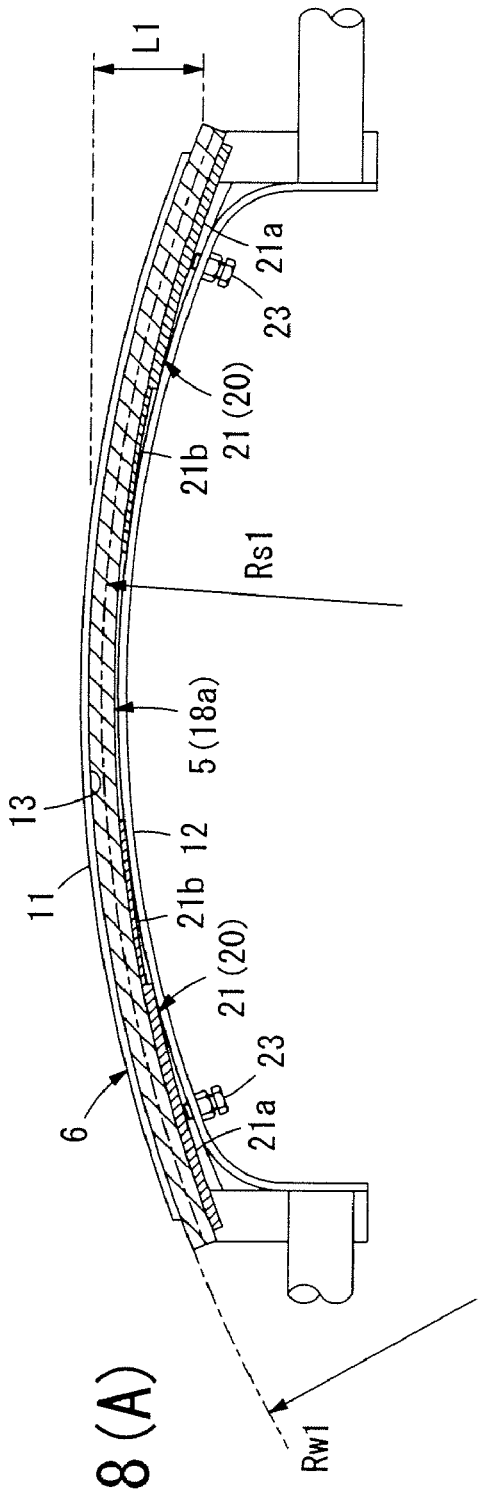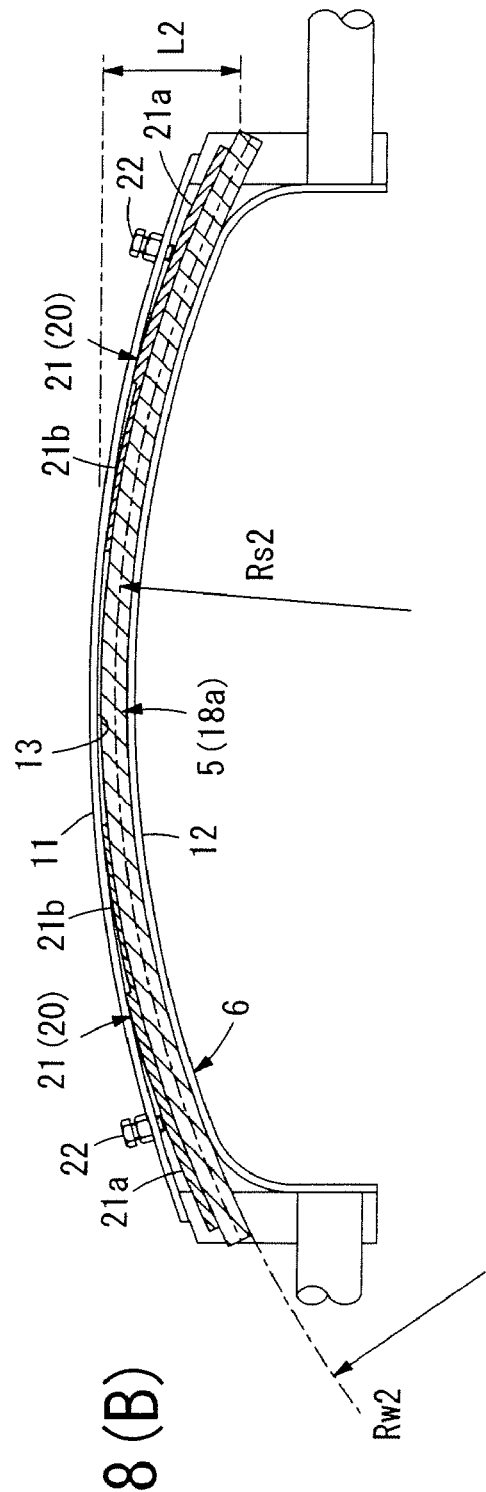

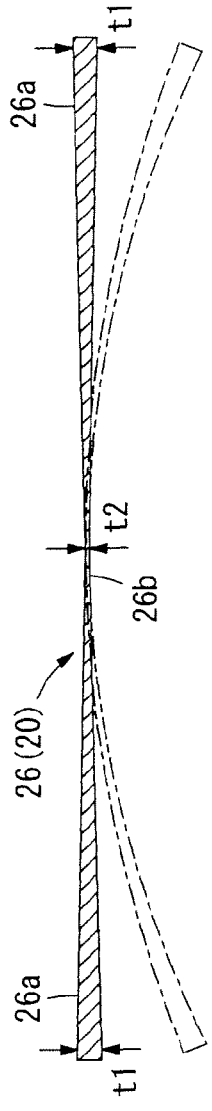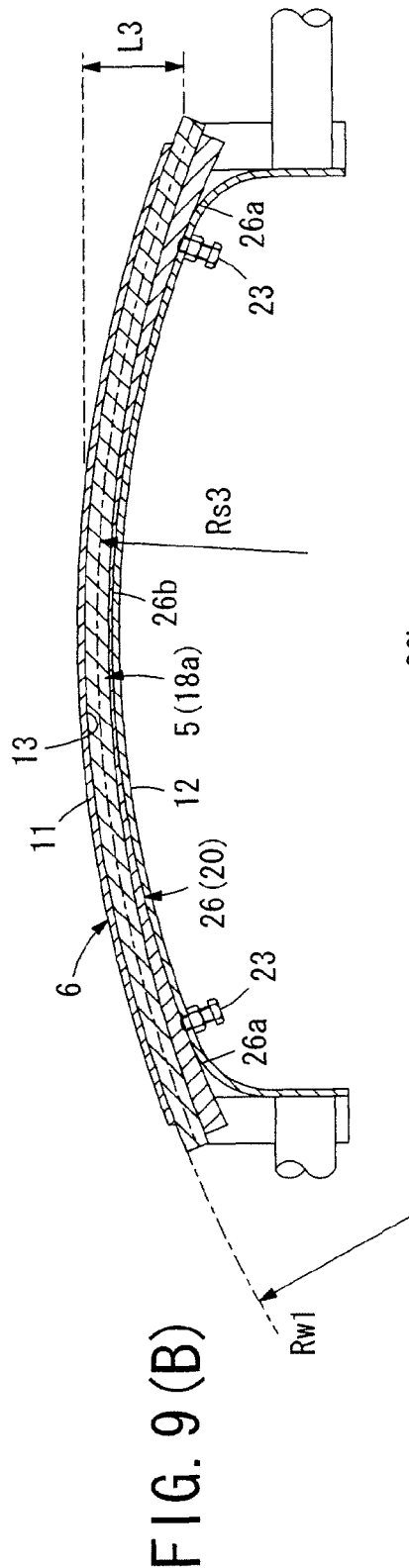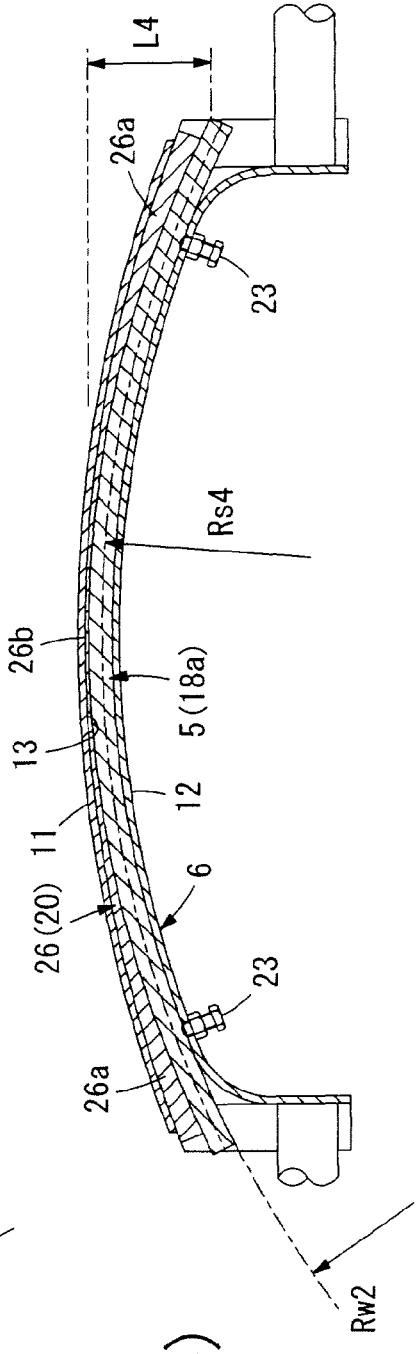
FIG. 9 (A)   FIG. 9 (B)   FIG. 9 (C)

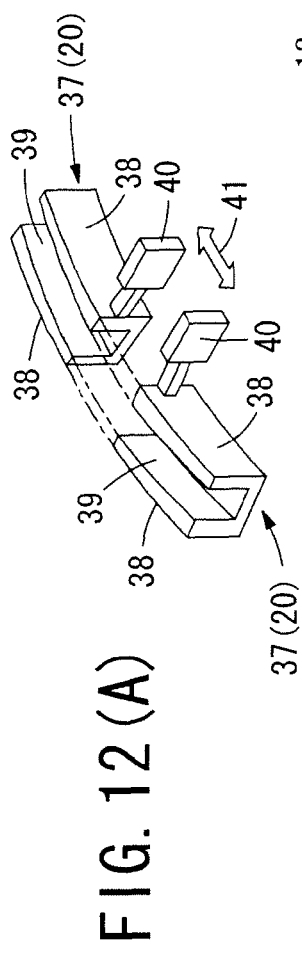
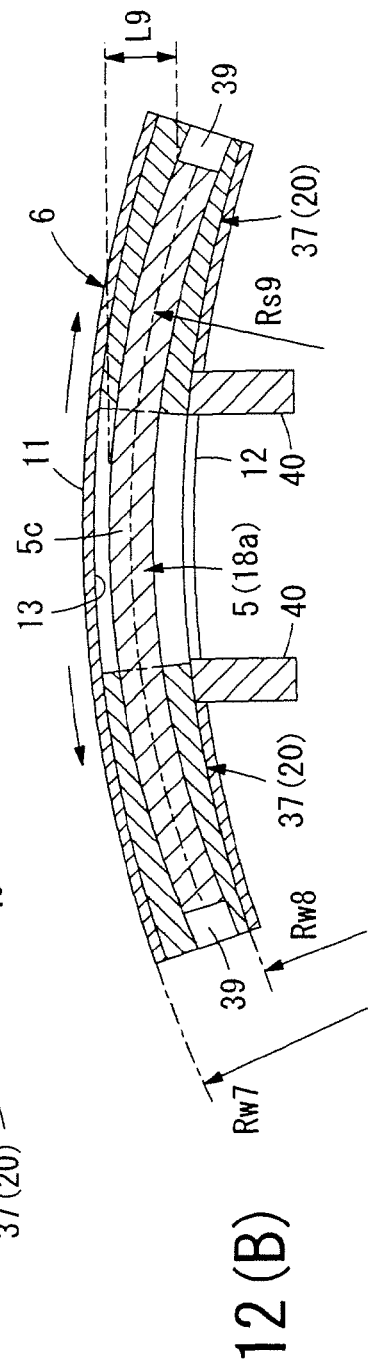
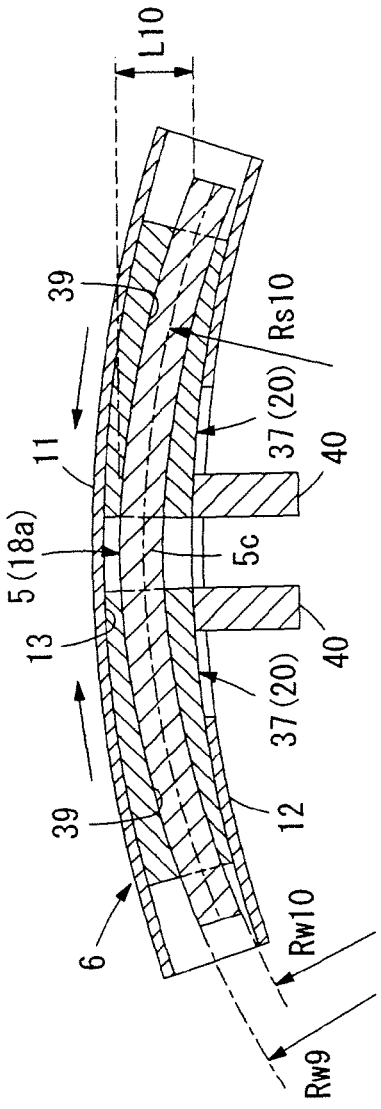
FIG. 12 (A)
FIG. 12 (B)
FIG. 12 (C)

FIG. 13 (A) (Prior Art)

BELT CLEANER

BACKGROUND OF THE INVENTION

1. Field of the Invention

The present invention relates to a belt cleaner for removing the leavings of conveying material, e.g. coke, stuck on the surface of a conveyor belt during the return movement of the belt.

2. Description of Related Art

A prior art cleaner for a conveyor belt is disclosed in U.S. Pat. No. 3,841,470 wherein the belt cleaner includes a plurality of cleaner means disposed thereon in the transverse direction of the conveyor belt at the return running side thereof. Each cleaner means has a scraping portion thereof which intends to come into contact with the belt surface, while all of which are arranged in linear relationship. More specifically, said cleaner means which includes a scraper having said scraping portion formed with a tip member at uppermost end thereof is yieldingly supported by a resilient member so that the scraping portion thereof becomes in contact with the belt surface under pressure by the resilience of said resilient member.

It is known that an endless conveyor belt, which is fitted for running in a circle between a drive pulley and an idler pulley, is supported on the forward running side thereof by a plurality of guide rollers arranged at "trough" angles so as to be curved in an arcuate shape in cross section in order to carry the transferring material in a stable manner. In other words, on the forward running side of the belt where the material is transferred forward, the belt is supported so that the lengthwisely extending central region thereof can arcuately be deflected downward. The transferring materials are consecutively transferred generally on the central region of the belt, which will result in intensive wear on the central region of the belt surface rather than on both side regions of the same.

Because of the tendency to deflection (termed generally as a "trough" tendency), the belt is deflected arcuately upward on the return running side of the belt where the belt runs backward after discharging the transferring material therefrom. In such an arrangement of the known cleaner, the scraping portions of the cleaner means arranged in linear relationship are prevented from matching the belt surface when coming into close contact with the same. More specifically, there is a clearance between the scraping portions arranged linearly and the central region of the belt surface. The clearance becomes greater when the amount of wear on the central region of the belt surface is increased. Consequently, the leavings of material on the central region of the belt surface cannot positively be scraped off by the scraping portions of the cleaner. Since the leavings of material adhered to the belt are substantially greater in amount at the lengthwisely extending central region of the belt surface than the side regions of the same, some of the scraping portions disposed in the center get worn intensively in proportion to the amount of scraped material. This allows said clearance to become greater gradually.

Under the circumstances, an improved type of belt cleaner was developed by Nippon Tsusho Kabushiki Kaisha under the product name "U-Type Cleaner" to which some patents were granted as shown in the following patent documents.

Patent document 1: JP-H2-50009B (corresponding to EP0289659B1)

Patent document 2: JP-H5-65407B (corresponding to EP0338118B1)

Patent document 3: JP-H7-20766B

Patent document 4: JP-H11-35135A (corresponding to EP0891934B1)

SUMMARY OF THE INVENTION

Problems to be Solved by the Invention

According to a belt cleaner disclosed in the patent documents 1-4, a scraper is adjustably supported for rotary displacement about an axis extending in a transverse direction of the belt and has a scraping portion thereon which intends to be in contact with the belt surface and is outwardly deflected a maximum from the axis at a point midway between the side ends of the belt. Accordingly, when the scraper is turned upward about the axis to its standing position, the scraping portion thereof will arch its central region as lifted upward. This allows the scraping portion of the scraper to remain in close contact with the belt surface without clearance even if either the belt is trough-shaped in cross section or lengthwisely extending central region of the belt surface gets worn, whereby the leavings on the belt surface will be scraped off in an optimum manner.

According to the belt cleaner disclosed in the patent documents 2 and 3, the scraper is formed in a belt-like shape by a resilient board in which support members are embedded in a row, said resilient board comprises a cover wall extending integrally along over the aligned support members and covering the surfaces thereof, and hinge portions connecting each two adjoined support members flexibly with each other so as to allow the scraper to be bent in a curved form. A holder provides holding means which holds said cover wall of the scraper in the curved form via said hinge portions so that the scraper deflects a maximum at a point midway between both ends of the belt from the axis extending transversely of the belt. The scraper is flexible to match the arcuate shape of the holding means in the holder. It is thus unnecessary for the scraper to have a shape corresponding to the arcuate shape of the holding means, which facilitates its fabrication.

According to the belt cleaner disclosed in the patent documents 1-4, the scarping portion of the scraper having a curved shape will get contact with the belt surface when the scraper is turned upward to its standing position. The scraping portion contacts the trough-shaped belt surface without causing clearance as far as the scraping portion and the belt surface are mutually of the same arcuate shapes as expected. However, if the trough-shape of the belt surface is different from the shape as expected, the scraping portion cannot become in contact with the belt surface over the full width thereof.

This aspect of the problem is explained with reference to illustrations as follows. As shown in FIG. 13(A), in case that the scraper 2 has a scraping portion 3 curved with a radius of curvature Rs which is parallel with the belt surface of a trough-shape curved with a radius of curvature Rb, the scraping portion 3 will contact the belt surface over the full width thereof and the leavings on the belt surface will be scraped off in an optimum manner.

According to the inventor's discovery, however, in case that a belt 1a has a trough-shaped surface curved with a radius of curvature Rb1 (Rb1>Rb) as shown in FIG. 13(B), said scraper 2 in which the scraping portion 3 is curved with said radius of curvature Rs will cause clearances S1 and S1 at both sides between the scraping portion 3 and the belt surface. As a result, the scraping portion 3 cannot scrape the leavings on the belt surface effectively at the clearances S1 and S1. The clearances S1 and S1 can be reduced by pushing the scraping portion 3 of the scraper 2 against the belt surface to deform the belt 1a, however, the belt may have a risk of being torn or damaged at the center due to the high contact pressure exerted by the scraping portion 3 at the center thereto. Further, the center of the scraping portion 3 will be worn faster than the both sides, and then a partial wearing of the scraping portion will be expedited.

On the other hand, in case that a belt 1b has a trough-shaped surface curved with a radius of curvature Rb2 (Rb2<Rb) as shown in FIG. 13(C), said scraper 2 in which the scraping portion 3 is curved with said radius of curvature Rs will cause a clearance S2 at the center between the scraping portion 3 and the belt surface. As a result, the scraping portion 3 cannot scrape the leavings on the belt surface effectively at the clearance S2. The clearance S2 can be reduced by pushing the scraping portion 3 of the scraper 2 against the belt surface to deform the belt 1a, however, the belt has a risk of being torn or damaged at the side ends due to the high contact pressure exerted by the scraping portion 3 at the side ends thereto. Further, the side ends of the scraping portion 3 will be worn faster than the center, then a partial wearing of the scraping portion will be expedited.

Means for Solving the Problems

The present invention provides a belt cleaner having a scraper for removing the leavings of conveying material on the surface of a conveyor belt during the return movement of the belt wherein a scraping portion of the scraper becomes in close contact with the belt surface over the full width thereof even when the belt surface has any trough-shaped configurations different than the shape as expected.

The present invention provides a belt cleaner which removes the leavings of conveying material on the surface of a conveyor belt during the return movement thereof comprising a scraper (5), a holder (6) holding said scraper and tension means. Said holder (6) provides a pair of holding walls (11, 12) extending in the transverse direction of the belt and a holding groove (13) formed between said walls which is curved gradually from the both side portions to the central portion thereof in the lengthwise direction of the belt. Said tension means are disposed on the both sides of the belt for pushing said holder (6) to rotate about an axis (A) extending in the transverse direction of the belt so that said holder (6) is turned upward to its standing position. Said scraper (5) comprises a resilient blade which is yieldingly deformable in such manner as to be curved from the linear state to an arch shape so that said scraper (5) is curved in an arcuate shape to form a distance (L) between the central portion and the both side portions thereof with respect to the lengthwise direction of the belt when said scraper (5) is held in said holding groove (13). Shape shifting means (20) is provided in said holding groove (13) for transforming said scraper (5) into a desired curved configuration selected from among plural curved configurations differing said distance (L) thereby the scraper (5) is held to keep said selected curved configuration.

According to the present invention, such belt cleaner is provided that the scraper (5) is held in the holding groove (13) of the holder (6) to be curved in an arcuate configuration having a distance (L) between the central portion and the both side portions thereof with respect to the lengthwise direction of the belt, wherein said shape shifting means (20) makes it possible that said curved configuration of the scraper (5) can be transformed to a desired configuration selected from among various curved configurations differing said distance (L) and the scraper (5) is held to keep said selected configuration. Accordingly, the scraping portion (7) of the scraper (5) will become in contact with the belt surface over the full width thereof even when the trough-shape of the belt is different than that of expected at a work site. As a result, the leavings on the belt surface are scraped off effectively over full width of the belt surface.

According to a first embodiment of the present invention, the holder (6) comprises a front holding wall (11), a rear holding wall (12) and a holding groove (13) formed between said walls. Said front holding wall (11) is curved arcuately with a radius of curvature Rw1 and said rear holding wall (12) is curved arcuately with a radius of curvature Rw2 under the conditions of Rw1>Rw2 so that the width W1 at the central region and the width W2 at the both side regions of said holding groove (13) are formed to be W2>W1. Thereby the both side ends of the scraper (5) are allowed to move between the holding walls (11, 12) within the holding groove (13). The shape shifting means (20) comprises one or more filler plates (21, 21) (26) of flexible material having thick portions (21a) (26a) and thin portions (21b) (26b) which are inserted between the scraper (5) and one of the holding walls (11, 12). By selecting the positions of the filler plates to be inserted in the holding groove (13), said distance (L) of the scraper (5) may be shifted between two different distances (L1 or L3) and (L2 or L4) that are defined under the conditions of L1<L2 and L3<L4. When the filler plate(s) is inserted between the scraper (5) and the rear holding wall (12), the scraper (5) is curved along the inner surface of the front holding wall (11) so that the scraper (5) is held in the arcuate configuration having said distance (L1 or L2). Alternatively, when the filler plate(s) is inserted between the scraper (5) and the front holding wall (11), the scraper (5) is curved along the inner surface of the rear holding wall (12) so that the scraper (5) is held in the arcuate configuration having said distance (L3 or L4).

According to another embodiment of the present invention, the holder (6) has substantially the same construction as mentioned about said first embodiment. The shape shifting means (20) comprises a pair of filler plates (27, 27) of flexible material having a thin portion (27b) and a thick portion (27a) respectively By inserting the filler plates (27, 27) between the scraper (5) and one of the holding walls (11, 12), the scraper (5) is held in the holding groove and is curved in an arcuate configuration having said distance (L). By selecting the directions of the filler plates to be inserted, said distance (L) of the curved scraper (5) may be shifted from one to another between two different distances (L5) and (L6) which are defined under the conditions of L5<L6. When the filler plates (27, 27) are inserted in the holding groove (13) so as to oppose the respective thick portions (27a) with each other, the scraper (5) is held in the arcuate configuration having said distance (L5). Alternatively, when the filler plates (27, 27) are inserted in the holding groove (13) so as to oppose the respective thin portions (27b) with each other, the scraper (5) is held in the arcuate configuration having said distance (L6).

According to further another embodiment of the present invention, the shape shifting means (20) comprises a pair of movable members (29, 29) movably mounted in the holding groove (13) of the holder (6). Each movable member (29) has a holding channel (31) formed in an arcuate shape for holding the scraper (5), and provides one end thereof with pivot means (32) and the other end thereof with operation means (33). Said pivot means (32)(32) of the movable members (29, 29) are pivoted at the central region of the holding groove (13) of the holder (6), while the both pivot means (32, 32) are positioned apart from each other with a space (C). Actuators (34) are provided to move the operation means (33) respectively in the holding groove (13). Accordingly, the scraper (5), which is held in the holding channels (31, 31) within the holding groove (13) and is curved in an arcuate shape having said distance (L), may be transformed its shape to vary the distance (L) without stages between two different distances (L7) and (L8) which are defined under the conditions of L7<L8. When the actuators (34) move the operation means (33, 33) toward the front holding wall (11) of the holder (6), the scraper (5) is held in the arcuate configuration having said distance (L7). On the other hand, when the actuators (34) moves the operation means (33, 33) toward the rear holding wall (12) of the holder (6), the scraper (5) is held in the arcuate configuration having said distance (L8).

According to further another embodiment of the present invention, the shape shifting means (20) comprises a pair of slidable members (37, 37) slidably mounted in the holding groove (13) of the holder (6). Said slidable members (37, 37) have holding channels (39, 39) respectively for holding the scraper (5) and are inserted in the holding groove (13) so as to be spaced apart from each other at the central region of the holding groove (13). An actuator (41) is provided to slide the slidable members (37, 37) in forward and backward directions along the curved passage of the holding groove (13). Accordingly, the scraper (5), which is held in the holding channels (31, 31) within the holding groove (13) and is curved in an arcuate shape having said distance (L), may be transformed its shape to vary the distance (L) without stages between two different distances (L9) and (L10) which are defined under the conditions of L9<L10. When the actuator (41) slides the slidable members (37, 37) to be close with each other, the scraper (5) is held in the arcuate configuration having said distance (L9). On the other hand, when the actuator (41) slides the slidable members (37, 37) to be apart from each other, the scraper (5) is held in the arcuate configuration having said distance (L10).

BRIEF DESCRIPTION OF THE DRAWINGS

FIG. 3(A), FIG. 3(B) and FIG. 3(C) show an embodiment of a scraper used for the belt cleaner according to the invention, in which FIG. 3(A) is a perspective view showing a front side of the scraper which is curved, FIG. 3(B) is a perspective view of the scraper which is not curved and FIG. 3(C) is a perspective view showing a back side of the scraper which is not curved.

FIG. 6(A) and FIG. 6(B) show one of a pair of filler plates constituting a first embodiment of the shape shifting means according to the invention, in which FIG. 6(A) is a perspective view showing the filler plate which is not curved and FIG. 6(B) is a perspective view showing the filler plate which is divided at a vertical groove and is curved.

FIG. 7(A), FIG. 7(B) and FIG. 7(C) show the first embodiment of the shape shifting means, in which FIG. 7(A) is a cross sectional view showing a scraper blade, FIG. 7(B) is a cross sectional view showing a pair of filler plates and FIG. 7(C) is a cross sectional view of the holder.

FIG. 8(A) and FIG. 8(B) show operations of the first embodiment of the shape shifting means, in which FIG. 8(A) is a cross sectional view showing the scraper held and curved with a radius of curvature Rs1 and FIG. 8(B) is a cross sectional view showing the scraper held and curved with a radius of curvature Rs2.

FIG. 9(A), FIG. 9(B) and FIG. 9(C) show a second embodiment of the shape shifting means according to the invention, in which FIG. 9(A) is a cross sectional view showing a filler plate constituting the shape shifting means, FIG. 9(B) is a cross sectional view showing the scraper held and curved with a radius of curvature Rs3 and FIG. 9(C) is a cross sectional view showing the scraper held and curved with a radius of curvature Rs4.

FIG. 10(A), FIG. 10(B) and FIG. 10(C) show a third embodiment of the shape shifting means according to the invention, in which FIG. 10(A) is a cross sectional view showing a pair of filler plates constituting the shape shifting means, FIG. 10(B) is a cross sectional view showing the scraper held and curved with a radius of curvature Rs5 and FIG. 10(C) is a cross sectional view showing the scraper held and curved with a radius of curvature Rs6.

FIG. 11(A), FIG. 11(B) and FIG. 11(C) show a fourth embodiment of the shape shifting means according to the invention, in which FIG. 11(A) is a cross sectional view showing a pair of movable members constituting the shape shifting means, FIG. 11(B) is a cross sectional view showing the scraper held and curved with a radius of curvature Rs7 and FIG. 11(C) is a cross sectional view showing the scraper held and curved with a radius of curvature Rs8.

FIG. 12(A), FIG. 12(B) and FIG. 12(C) show a fifth embodiment of the shape shifting means according to the invention, in which FIG. 12(A) is a cross sectional view showing a pair of slidable members constituting the shape shifting means, FIG. 12(B) is a cross sectional view showing the scraper held and curved with a radius of curvature Rs9 and FIG. 12(C) is a cross sectional view showing the scraper held and curved with a radius of curvature Rs10.

FIG. 13(A), FIG. 13(B) and FIG. 13(C) show operations of a prior art belt cleaner, in which FIG. 13(A) illustrates a scraper being in contact with a belt surface having a trough shape curved with a radius of curvature Rb, FIG. 13(B) illustrates the same scraper being in contact with a belt surface having a different trough shape curved with a radius of curvature Rb1 and FIG. 13(C) illustrates the same scraper being in contact with a belt surface having a further different trough shape curved with a radius of curvature Rb2.

DETAILED DESCRIPTION OF THE INVENTION

Figure 1:
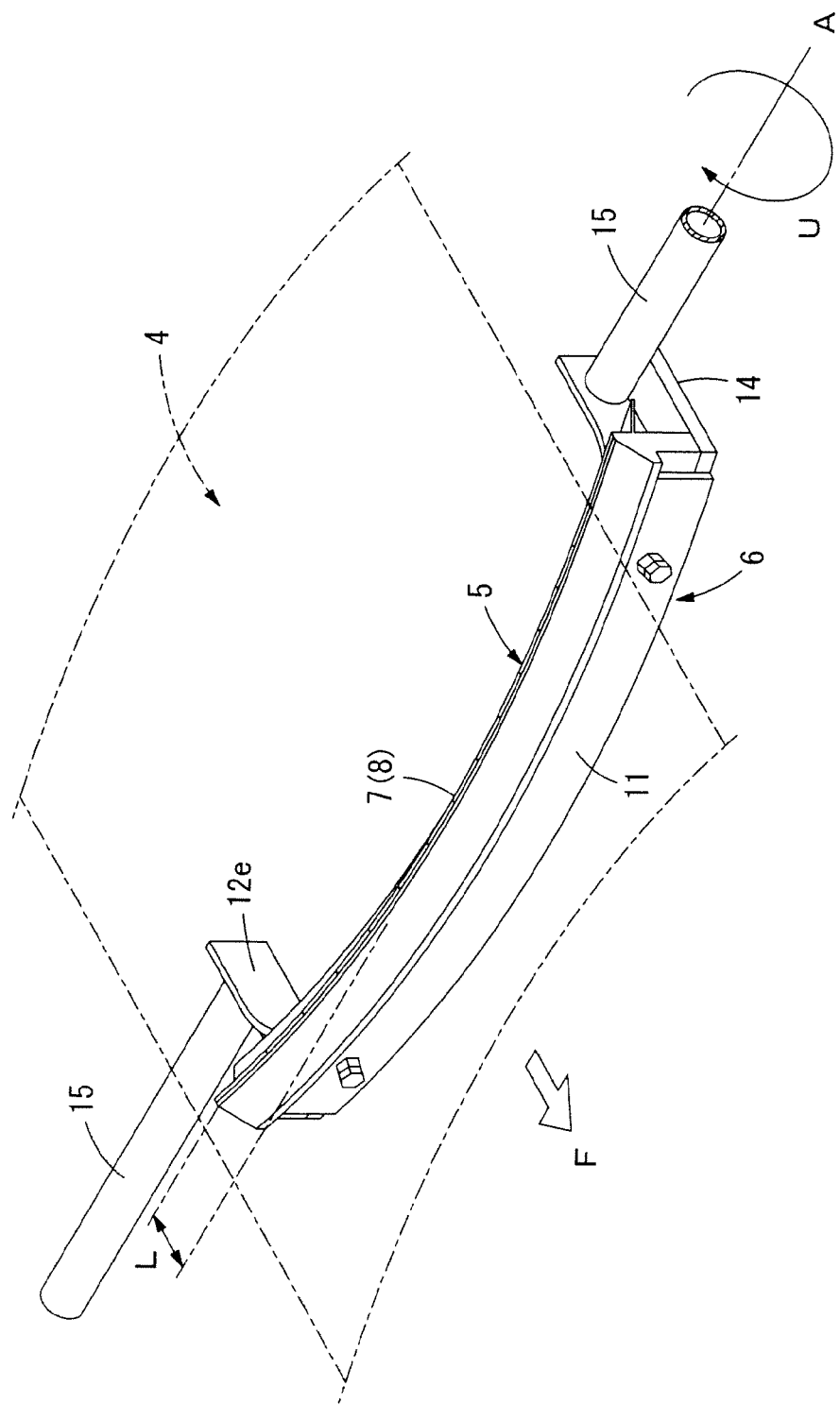
FIG. 1 is a perspective view showing a front side of a belt cleaner according to the invention.

Preferred embodiments of the present invention will be described in detail in conjunction with the accompanying drawings.

In the embodiments described hereinafter, a belt cleaner according to the present invention is disposed in the transverse direction of and on the return running side of a conveyor belt 4 and includes a scraper 5 for removing the leavings stuck on the belt surface, and a holder 6 for holding said scraper 5. The holder 6 is adjustably supported for rotary displacement about an axis (A) extending in the transverse direction of the belt. The scraper 5 has a scraping portion 7 thereon which intends to be in contact with the belt surface and is outwardly deflected a maximum from the axis (A) at a point midway between the side ends of the belt 4 so that the scraper 5 can be formed in an arcuate shape.

In the drawings, a length of the conveyor belt 4 on the return running side is shown in particular. The side referred to as the "return running side" is opposite to the forward running side of the belt on which the amount of material is transferred forward. After unloading the transferring material, the belt fitted between a drive pulley and an idler pulley to run in a circle makes a full turn at the terminal end thereof where one of the pulleys is mounted in position, and then will run backward opposite to the forward direction throughout the return section. Therefore, the return running side includes a running passage on the pulley after the turning point.

General Arrangement of Belt Cleaner

A pair of supporting devices (not shown) are fixedly disposed on both right and left sides of the belt 4 at the return running side of the same. The supporting devices which may be substantially the same devices as disclosed in the patent documents 1-4 are arranged in symmetrical relationship at the respective sides of the belt.

Figure 2:
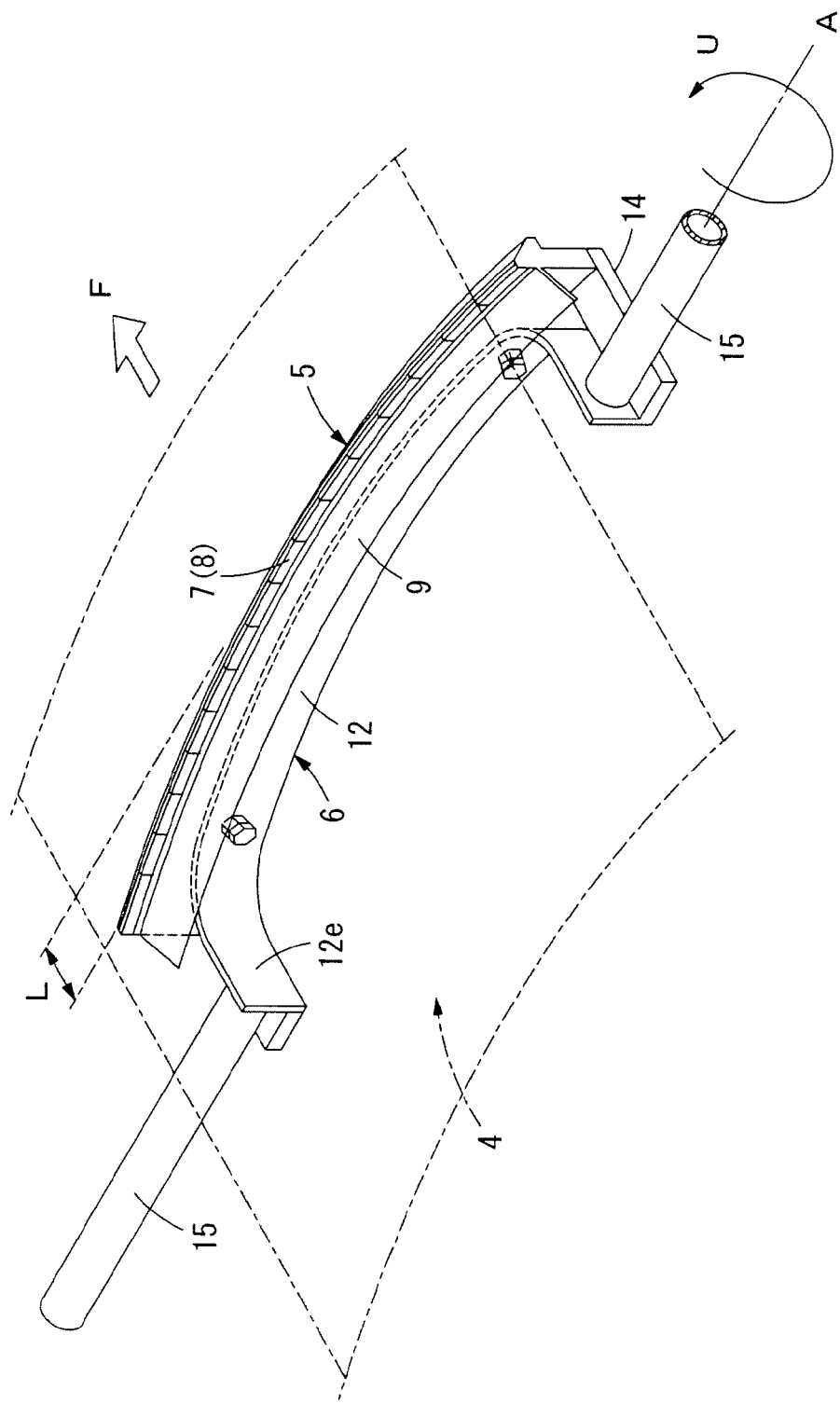
FIG. 2 is a perspective view showing a back side of the belt cleaner according to the invention.

As shown in FIGS. 1 and 2, the scraper 5 is detachably supported by the holder 6 of an arcuate shape deflecting in the return running direction (F) of the belt 4. The scraper 5 is deformed in a curve to match the arcuate shape of the holder 6 and then, mounted on the holder 6. The scraper 5 has tips 8 of wear-resistant material such as carbide alloy or ceramic fixedly mounted on the back top thereof. A resilient sheet 9 such as a rubber sheet is provided on the back side of the scraper 5 beneath the tips 7. The sheet 9 is connected integrally at the top end thereof to the scraper and extends downward so as to cover the back of the scraper 5.

Figure 4:
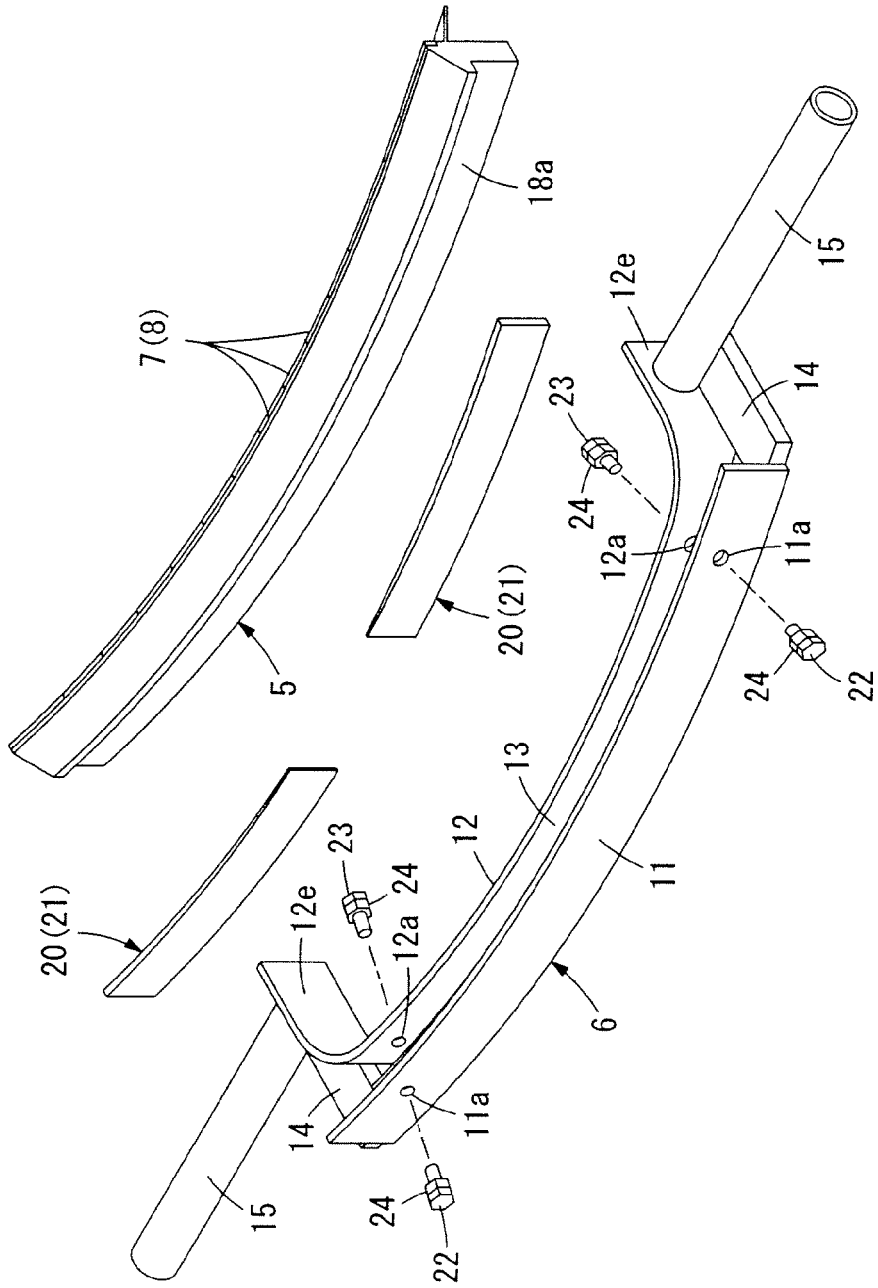
FIG. 4 is a perspective view showing the belt cleaner according to the invention in which a holder, a scraper and shape shifting means are disassembled.
Figure 5:
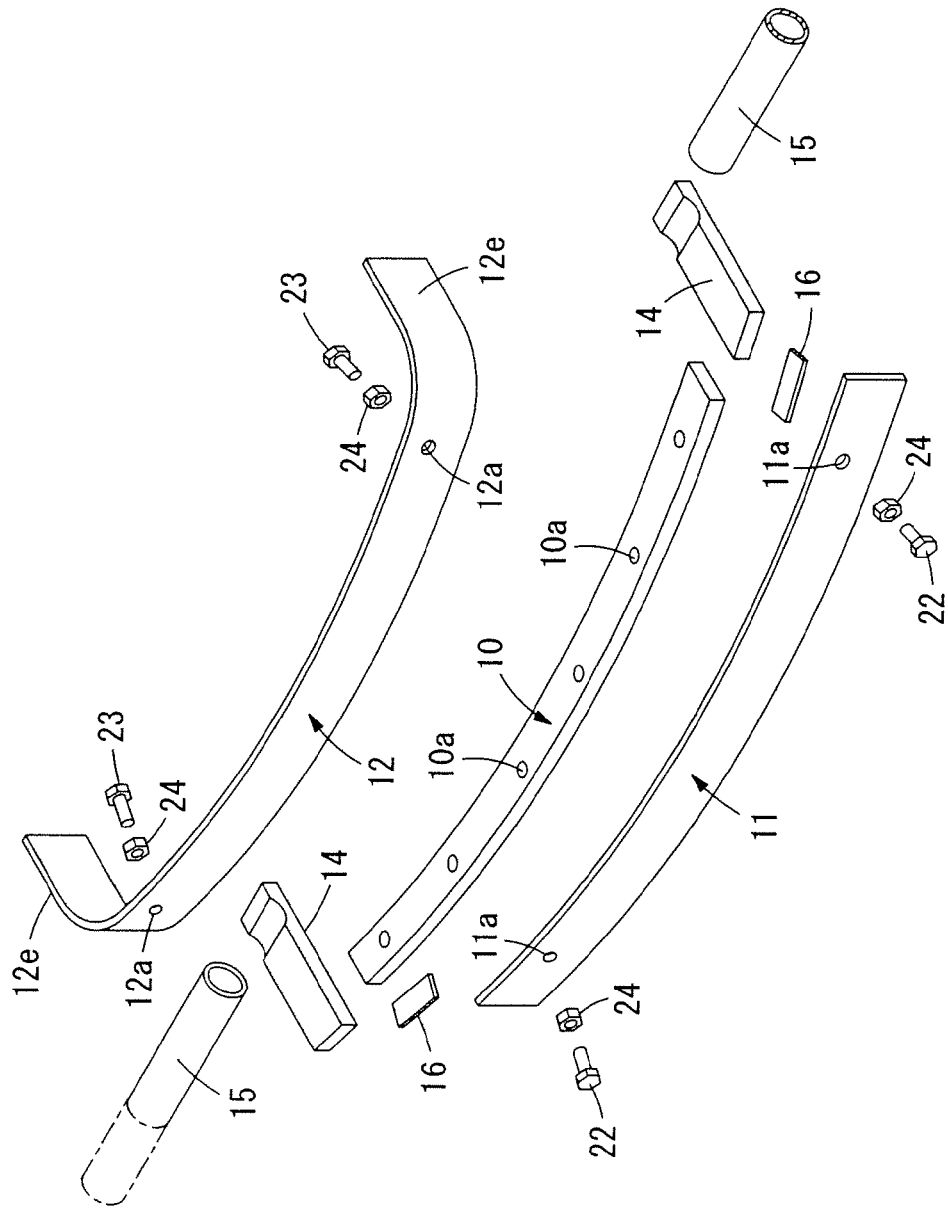
FIG. 5 is a perspective view showing the holder used for the belt cleaner according to the invention in a disassembled state.
Figure 6:
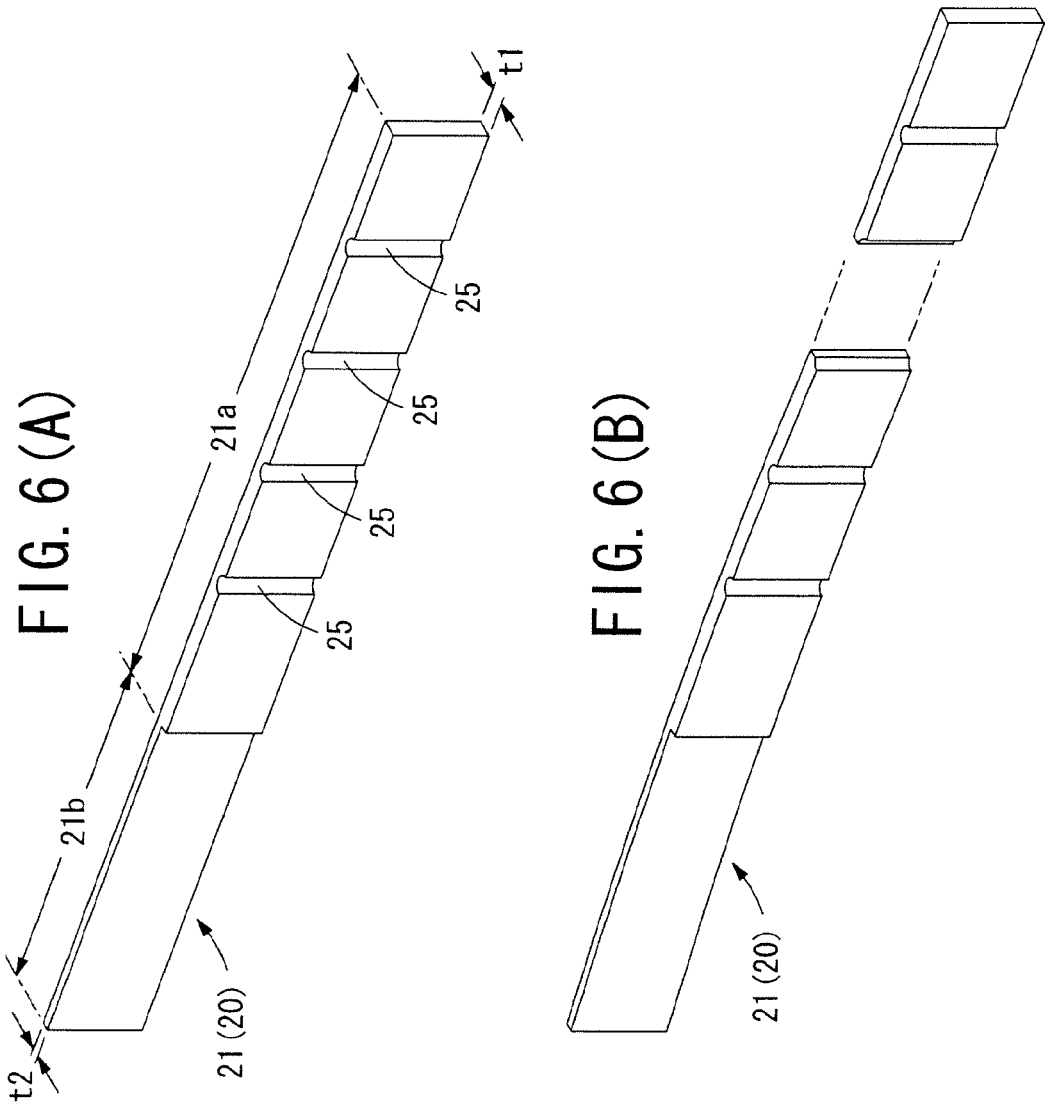

As shown in FIGS. 4 and 5, the holder 6 comprises an arcuate bottom member 10 and two rail-like holding walls 11 and 12 fixedly secured to the bottom member 10 by welding or the like so as to form a holding groove 13 for holding the scraper 5. Both distal ends of the rear wall 12 have elongated portions 12e, 12e extending in the direction opposite to the return running direction (F) to which seat plates 14, 14 are fixedly secured respectively by welding or the like. A pair of support shafts 15, 15 are fixedly secured to said seat plates 14, 14 and the elongated portions 12e, 12e at the respective ends of the holding groove 13 by welding or the like. The support shafts 15, 15 are coaxially disposed to form the common axis (A) so that the scraper 2 can turn about the axis (A). In the embodiment as shown, the seat plate 14 is also secured to the side edge of the bottom member 10. Further, the seat plate 14 and the bottom member 19 are connected by a connecting plate 16 by welding or the like.

The holder 6 holding the scraper 5 is arranged in place so that the belt can run across the axis (A), while the support shafts 15, 15 are supported by the supporting devices respectively. The supporting devices are provided with tension means (not shown) for pushing the holder to turn about the axis to its standing position. Such tension means may be substantially the same as disclosed in the patent documents 1-4. When the scraper 2, which is shaped in such manner that deflection from the axis (A) is a maximum at a point midway between the side ends of the belt 1, is turned upward (U) by rotating the support shafts 15, 15 about the axis (A) from its rest position to its working position, the top ends of tips 8 on the scraper 5 will arch its central region in the shape of an arcuate thus to define a scraping portion 7 of the same which is to be in contact with the concave surface of the belt 4.

Structure of Scraper

Figure 3A:
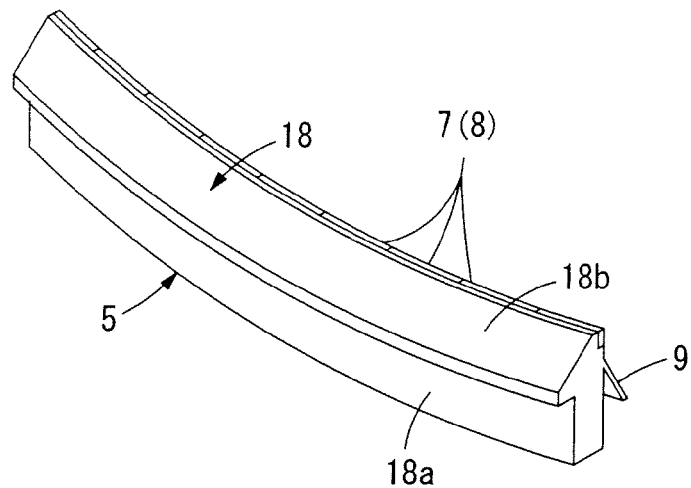
Figure 3B:
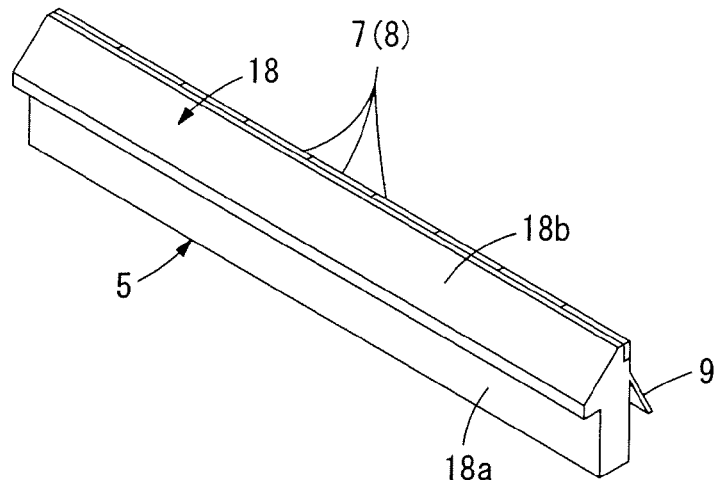
Figure 3C:
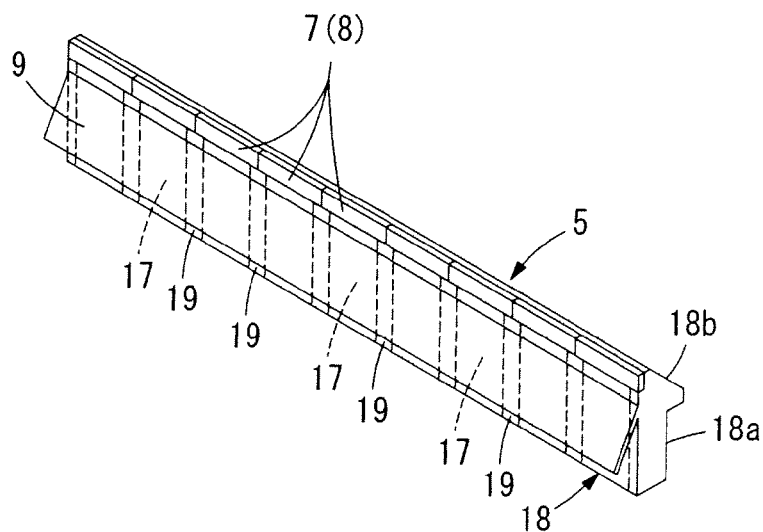

As shown in FIG. 3, the scraper 5 comprises a plurality of supporting members 17 made of metal plates provided with the tip 8 constituting the scraping portion 7 on the upper end by brazing, a substantial band-like resilient member 18 for connecting the supporting members 17 in parallel, and a rubber sheet 9 bonded along the supporting members 17 near the scraping portion 7. In the illustrated example, the tip 8 is formed in such manner as to have a length slightly larger than the width of the supporting member 17 so as to project from both sides of the supporting member 17, the plurality of supporting members 17 are aligned with aligning the tips 7 on the same line, and in this state the supporting members 17 are buried in the resilient member 18 made of natural rubber or synthetic rubber. Accordingly, the resilient member 18 forms a hinge portion 19 by filling the rubber in the gap between the adjacent supporting members 41, 41, thereby the blade-like scraper 5 is resiliently deformable through the hinge portions 19 so as to curve from the linear state to the arch shape. The resilient member 18 comprises a leg portion 18a to be inserted into the holding groove 13 of the holder 6 and a head portion 18b projecting from the holding groove 13 toward the surface of the belt 4. The present invention, however, is not limited to use such scraper 5 as shown in FIG. 3.

The scraper 5 forms a resilient blade which can be yieldingly deformable in such manner as to be curved from the linear state to the arch shape. By holding the leg portion 18a within the holding groove 13 of the holder 6, the scraper 5 is held curved in an arcuate shape to form a distance (L) between the central region and the both side regions with respect to the lengthwise direction of the belt as shown in FIGS. 1 and 2.

According to the present invention, shape shifting means 20 is provided in the holding groove 13 of the holder 6. The shape shifting means 20 makes it possible, with respect to the arcuate shape of the scraper, that the scraper 5 may be transformed within the holding groove 13 to keep a desired curved configuration by selecting any one among various different curved configurations differing the distance (L).

First Embodiment of Shape Shifting Means

FIG. 4 and FIGS. 6 to 8 show a first embodiment of the shape shifting means according to the present invention, in which the shape shifting means 20 comprises a pair of filler plates 21, 21 of flexible material.

As shown in FIG. 7, the front holding wall 11 and the rear holding wall 12 of the holder 6 are formed in such manner that the front holding wall 11 is curved arcuately with a radius of curvature Rw1 and the rear holding wall 12 is curved arcuately with a radius of curvature Rw2 under the conditions of Rw1>Rw2 so that the width W1 at the central region and the width W2 at the both side regions of said holding groove 13 are formed to be W2>W1. The front holding wall 11 provides a tapped hole 11a through each end portion thereof into which a bolt 22 is screwed as shown in FIG. 4. Similarly, the rear holding wall 12 provides a tapped hole 12a through each end portion thereof into which a bolt 23 is screwed. Preferably, each nut 24 is provided for locking each bolt 22, 23. In comparison to the width of the holding groove 13, the leg portion 18a of the scraper 5 is formed so as to make its thickness (T) to be T≦W1 as shown in FIG. 7. Accordingly, when the leg portion 18a is inserted in the holding groove 13 by deforming the scraper 5 in a curve, the both ends of the leg portion 18a are transformable and movable between the holding walls 11 and 12.

Each filler plate 21 is formed by a plate having high strength and flexibility made of plastic such as polycarbonate, nylon or the like. The thickness (t1) of one end 21a and the thickness (t2) of the other end 21b of the plate 21 are formed under the conditions of t1>t2, and the thickness (t1) of said one end 21a is under the conditions of t1≦(W2−T). In the illustrated example, the end portion 21a having the thickness (t1) is formed by an extending portion of the filler plate 21, and the other end portion 21b having the thickness (t2) is formed by the other extending portion of the filler plate 21. Another construction, however, may be employed in such manner that the thickness of the filler plate 21 is tapered gradually from one end to the other end.

According to the first embodiment as mentioned above, the scraper 5, which is curved in an arcuate shape having the distance (L) between the central portion and the both side portions thereof, is allowed to select its desired configuration by shifting the distance (L) between two different distances (L1) and (L2) which are defined under the conditions of L1<L2.

FIG. 8(A) shows the scraper 5 curved in an arcuate shape in which said distance (L1) is selected. The filler plate 21 is inserted between the leg portion 18a and the rear holding wall 12 so that the scraper 5 is held in the holding groove 13 to be curved along the front holding wall 11. The filler plates 21, 21 are inserted in the holding groove 13 in such manner that the thick ends 21a are positioned at the both side portions of the holding groove 13 and the thin ends 21b are positioned at the central portion of the holding groove 13. The leg portion 18a is clamped between the front holding wall 11 and the filler plates 21, 21 by screwing the bolts 23 through the rear holding wall 12. The scraper 5 is curved along the inner surface of the front holding wall 11 which is curved arcuately with a radius of curvature Rw1. As a result, the scraper 5 is held in the arcuate configuration with a radius of curvature Rs1 which forms said distance (L1) between the central region and the both side regions of the scraper.

FIG. 8(B) shows the scraper 5 curved in an arcuate shape in which said distance (L2) is selected. The filler plate 21 is inserted between the leg portion 18a and the front holding wall 11 so that the scraper 5 is held in the holding groove 13 to be curved along the rear holding wall 12. The filler plates 21, 21 are inserted in the holding groove 13 so as to position the thick ends 21a at the both side portions of the holding groove 13 and the thin ends 21b at the central portion of the same. The leg portion 18a is clamped between the rear holding wall 21 and the filler plates 21, 21 by the bolts 23 screwed through the front holding wall 11. The scraper 5 is curved along the inner surface of the rear holding wall 12 which is curved arcuately with a radius of curvature Rw2. As a result, the scraper 5 is held in the arcuate configuration with a radius of curvature Rs2 (Rs2<Rs1) which forms said distance (L2) between the central region and the both side regions of the scraper.

Accordingly, when the belt cleaner is set up on the return running side of the conveyor belt, the scraper 5 may be adjusted to hold a desirable arcuate configuration selected from two different curved configurations. Consequently, the scraping portion 7 of the scraper 5 becomes in contact with the trough-shaped belt surface over the full width thereof, when the scraper 5 is turned upward.

As shown in FIG. 5, plural apertures 10a are formed through the bottom member 10 of the holder 6. When the scraper 5 is replaced with new one after the scraping portion 7 has worn, the scraper 6 may be easily pulled out from the holder 5 by hitting a tool inserted through the aperture 10a.

As shown in FIG. 6(A), it is preferred to provide the filler plate 21 with a plurality of vertical grooves 25 in parallel on the surface thereof in order to facilitate the fabrication of belt cleaner including shape shifting means. A various length sized scrapers 5 and holders 6 are manufactured and provided corresponding to a width of conveyor belt 4. The filler plate 21 is formed so as to have its length corresponding to the longest scraper 5 and holder 6. The filler plate 21 may be shortened, as shown in FIG. 6(B), by cutting along the vertical groove 25 when it is used for a shorter scraper 5 and holder 6. There is another advantage of vertical grooves 25 to increase flexibility of the filler plate 21.

Second Embodiment of Shaping Shifting Means

In comparison to the first embodiment in which the shape shifting means 20 comprises a pair of filler plates 21 and 21, a second embodiment as shown in FIG. 9 provides the shape shifting means 20 comprising a single filler plate 26. The filler plate 26 is formed by a plate of high strength and flexibility made of plastic such as polycarbonate, nylon or the like. The thickness (t1) of both ends 26a, 26a and the thickness (t2) of the center 26b of the plate 26 are formed under the conditions of t1>t2. It is preferred to taper the thickness gradually from the both ends 26a, 26a to the center 26b. The scraper 5 and holder 6 have substantially the same constructions as shown in FIG. 7 (A) and FIG. 7 (C), the filler plate 26 forms the thickness (t1) at the both ends 26a, 26a under the conditions of t1≦(W2-T).

According to the second embodiment as shown in FIG. 9(B) and FIG. 9(C), the scraper 5, which is curved in an arcuate shape having the distance (L) between the central portion and the both side portions thereof, is allowed to select its desired configuration by shifting the distance (L) between two different distances (L3) and (L4) which are defined under the conditions of L3<L4.

FIG. 9(B) shows the scraper 5 curved in an arcuate shape in which said distance (L3) is selected. The leg portion 18a of the scraper 5 is inserted in the holding groove 13 and is curved along the inner surface of the front holding wall 11. The filler plate 26 is inserted between the rear holding wall 12 and the leg portion 18a, and the leg portion 18a is clamped between the front holding wall 11 and the filler plate 26 by screwing the bolts 23 through the rear holding wall 12. The scraper 5 is curved along the inner surface of the front holding wall 11 which is curved arcuately with a radius of curvature Rw1. As a result, the scraper 5 is held in the arcuate configuration with a radius of curvature Rs3 which forms said distance (L3) between the central region and the both side regions of the scraper.

FIG. 9(C) shows the scraper 5 curved in an arcuate shape in which said distance (IA) is selected. The leg portion 18a of the scraper 5 is inserted in the holding groove 13 and is curved along the inner surface of the rear holding wall 12. The filler plate 26 is inserted between the front holding wall 11 and the leg portion 18a, and the leg portion 18a is held by the bolts 23 within the holding groove 13. The scraper 5 is curved along the inner surface of the rear holding wall 12 which is curved arcuately with a radius of curvature Rw2. As a result, the scraper 5 is held in the arcuate configuration with a radius of curvature Rs4 (Rs4<Rs3) which forms said distance (IA) between the central region and the both side regions of the scraper.

Third Embodiment of Shaping Shifting Means

FIGS. 10 shows a third embodiment of the shape shifting means according to the present invention. The shape shifting means 20 comprises a pair of filler plates 27, 27 similar to the first embodiment. Accordingly, the filler plates 21, 21 mentioned above about the first embodiment shown in FIG. 8 may be used as the filler plates 27, 27 in this third embodiment. Each filler plate 27 is formed by a plate having high strength and flexibility made of plastic such as polycarbonate, nylon or the like. The thickness (t1) of one end 27a and the thickness (t2) of the other end 27b of the plate 27 are formed under the conditions of t1>t2. It is preferred to taper the thickness gradually from the one end 27a to the other end 27b. The scraper 5 and holder 6 have substantially the same constructions as shown in FIG. 7 (A) and FIG. 7 (C), however, the rear holding wall 12 provides preferably an additional tapped hole 12b through the central region thereof to which a bolt 28 is screwed. In this embodiment, the tapped apertures 11a and the bolts 22 on the front holding wall 11 as shown in FIG. 7(C) are not necessary to provide. The thickness (t1) of said one end 27a of the filler plate 27 is formed under the conditions of $t1 \leqq (W1-T)$.

According to the third embodiment, the scraper 5, which is curved in an arcuate shape having the distance (L) between the central portion and the both side portions thereof, is allowed to select its desired configuration by shifting the distance (L) between two different distances (L5) and (L6) which are defined under the conditions of L5<L6.

Figures 10A, 10B, 10C:
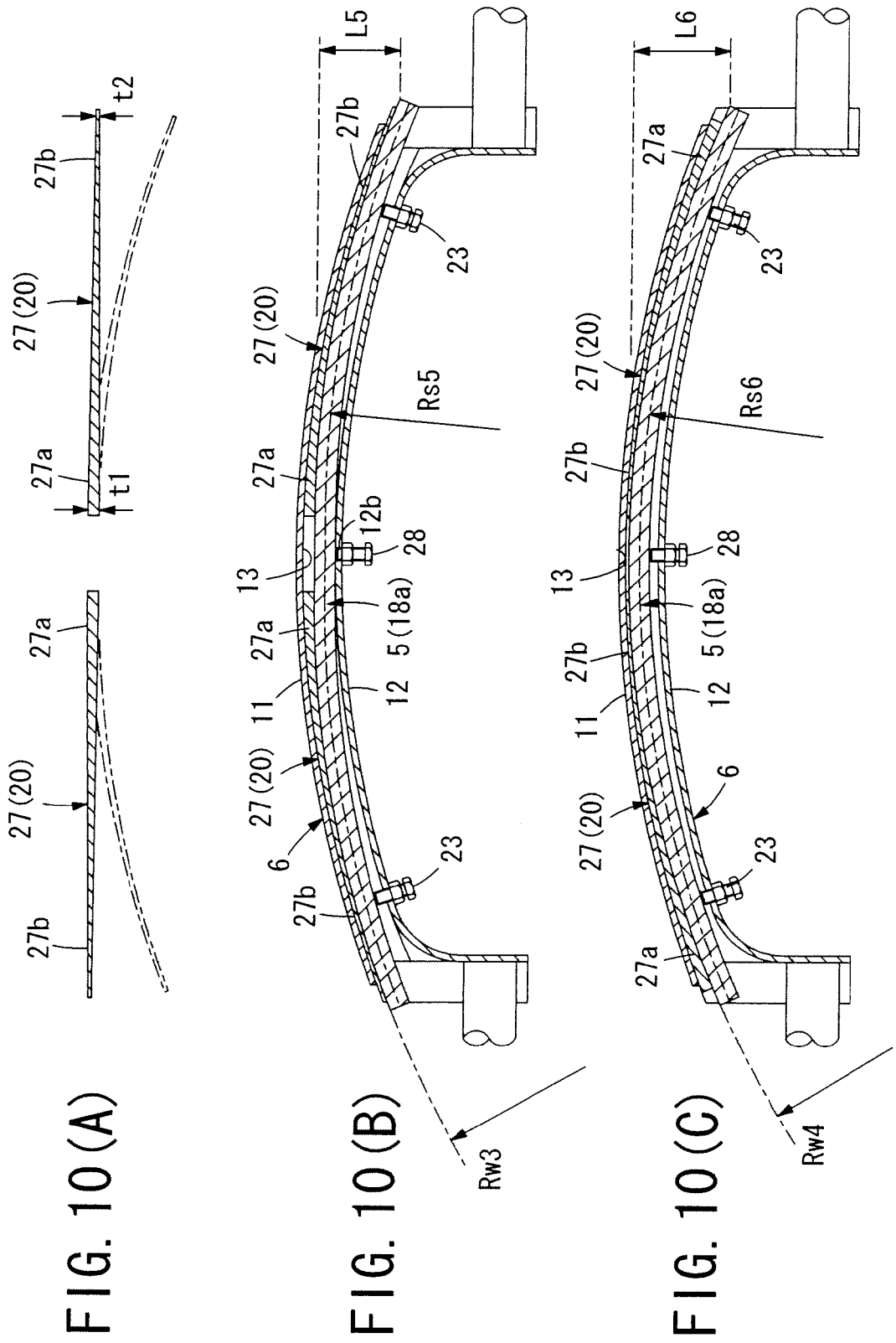

FIG. 10(B) shows the scraper 5 curved in an arcuate shape in which said distance (L5) is selected. The leg portion 18a of the scraper 5 is inserted in the holding groove 13 and the filler plates 27, 27 are inserted between the front holding wall 11 and the leg portion 18a. The filler plates 27, 27 are inserted in the holding groove 13 in such manner as to position the thick ends 27a, 27a at the central region of the holding groove 13 to be opposed with each other. The leg portion 18a is pushed against the filler plates 27, 27 by the bolts 23 and 28 screwed through the rear holding wall 12. The scraper 5 is curved along the surfaces of the filler plates 27, 27 which is curved arcuately with a radius of curvature Rw3. As a result, the scraper 5 is held in the arcuate configuration with a radius of curvature Rs5 which forms said distance (L5) between the central region and the both side regions of the scraper.

FIG. 10(C) shows the scraper 5 curved in an arcuate shape in which said distance (L6) is selected. The leg portion 18a of the scraper 5 is inserted in the holding groove 13, and the filler plates 27, 27 are inserted between the front holding wall 11 and the leg portion 18a. The filler plates 27, 27 are inserted in such manner that the thin ends 27b, 27b are positioned at the central region of the holding groove 13 to be opposed with each other. The leg portion 18a is pushed against the filler plates 27, 27 by the bolts 23 and 28 screwed through the rear holding wall 12. The scraper 5 is curved along the surfaces of the filler plates 27, 27 which is curved arcuately with a radius of curvature Rw4 (Rw4<Rw3). As a result, the scraper 5 is held in the arcuate configuration with a radius of curvature Rs6 (Rs6<Rs5) which forms said distance (L6) between the central region and the both side regions of the scraper.

The scraper 5 and holder 6 have substantially the same constructions in those described in connection with the first embodiment, the second embodiment and the third embodiment. The filler plates 21, 21 in the first embodiment, the filler plate 26 in the second embodiment, and the filler plates 27, 27 in the third embodiment are selectively used for the same scraper 5 and holder 6 if necessary. Further, the same filler plates may be used for the filler plates 21, 21 of the first embodiment as well as for the filler plates 27, 27 of the third embodiment in which the filler plates are inserted in the holding groove 13 by selecting the positions and directions from among various ways mentioned above.

Fourth Embodiment of Shaping Shifting Means

Figure 11:
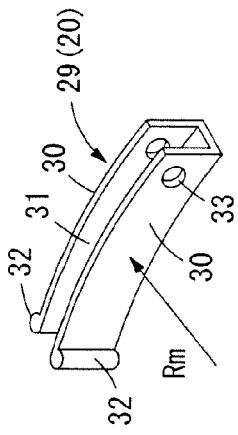
Figure 11:
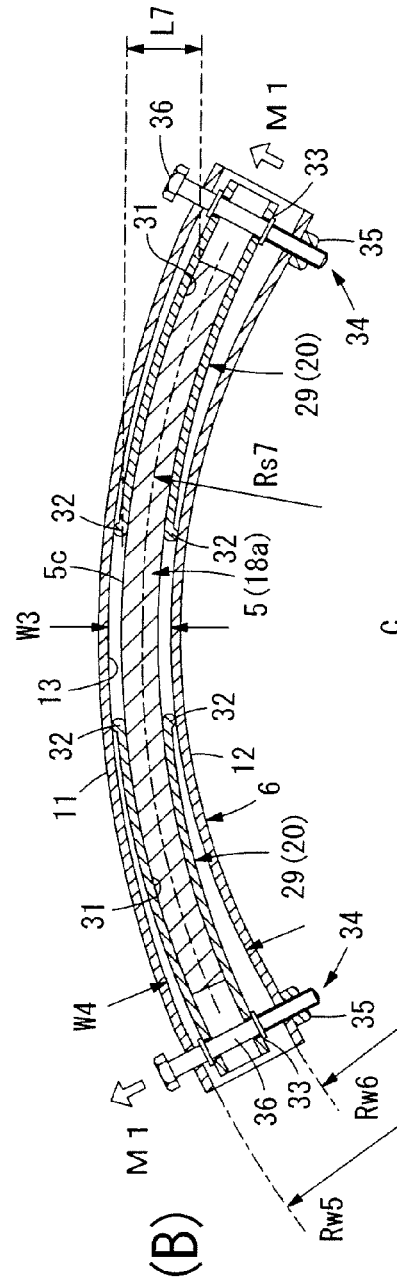
Figure 11:
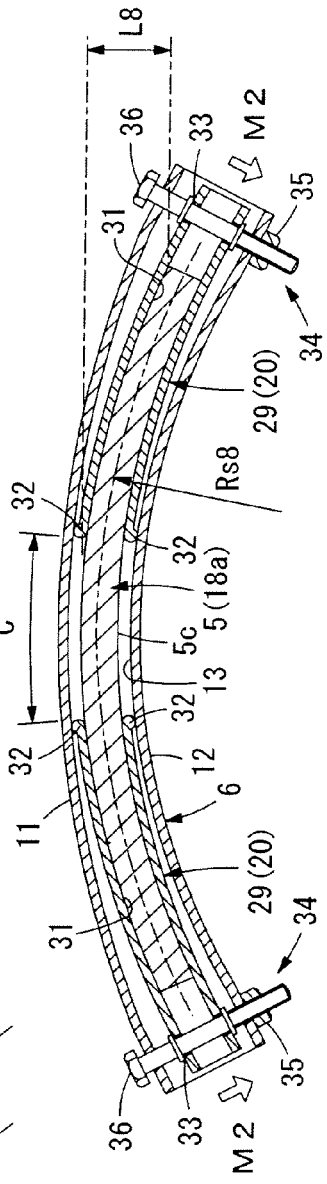
Figure 13:
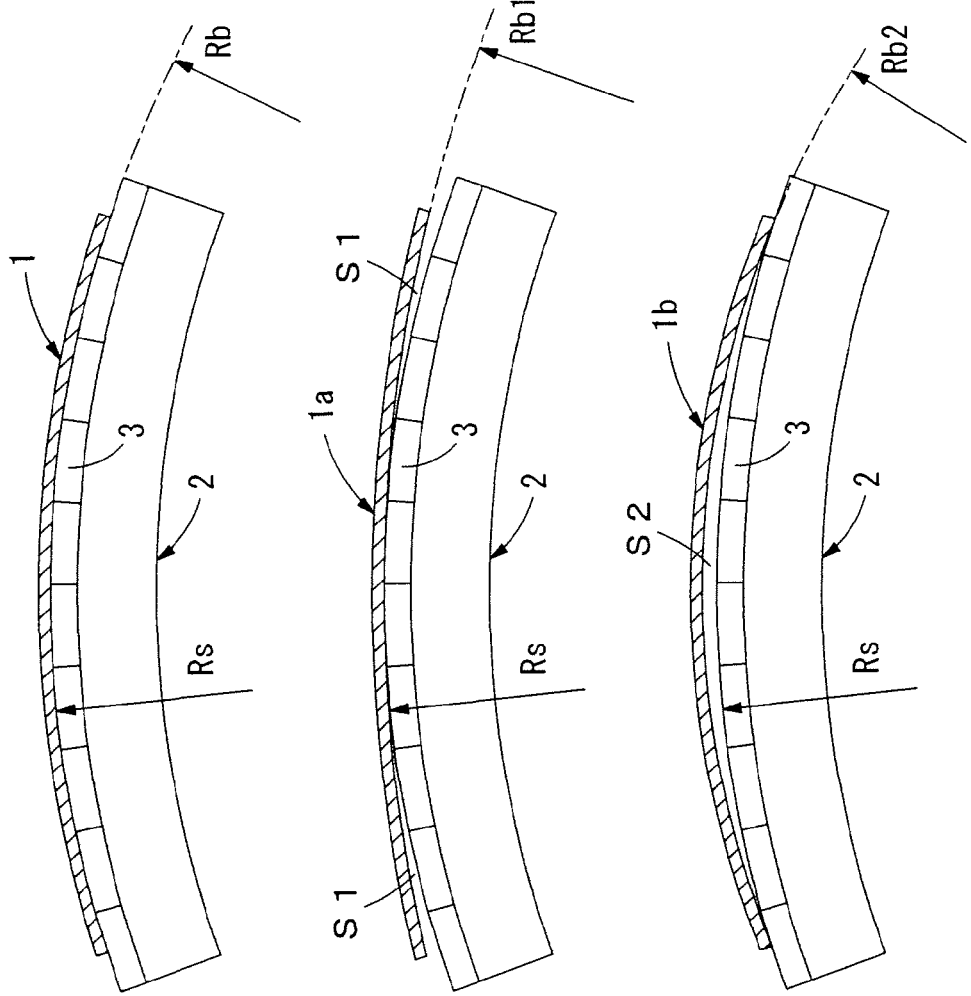

FIG. 11 shows a fourth embodiment of the shape shifting means 20 which allows to transform the scraper 5 into a desired arcuate configuration variably without stages.

The front holding wall 11 and the rear holding wall 12 of the holder 6 are formed in such manner that the front holding wall 11 is curved arcuately with a radius of curvature Rw5 and the rear holding wall 12 is curved arcuately with a radius of curvature Rw6 under the conditions of Rw5>Rw6 so that the width W3 of the central region and the width W4 of the both side regions of said holding groove 13 are formed to be W4>W3.

The shape shifting means 20 comprises a pair of movable members 29, 29. As shown in FIG. 11(A), each movable member 29 comprises a pair of holding plates 30, 30 curved and arranged in parallel, a holding channel 31 formed between the plates so as to curve in an arcuate shape having a radius of curvature Rm under the conditions of Rw5>Rm>Rw6. The holding plates 30, 30 provide one end thereof with pivot means 32 and the other end with operation means 33 such as apertures formed therethrough. The movable members 29, 29 are movably mounted in the holding groove 13 of the holder 6 in such manner to position the pivot means 32, 32 to be opposed with each other and separated from each other with a space (C) at the central region of the holding groove 13. Accordingly, the movable members 29, 29 are movable about the pivot means 32, 32 within the holding groove 13.

The holder 6 provides actuators 34, 34 at the respective ends thereof. In the illustrated example, the actuator 34 comprises a nut 35 secured to the rear holding wall 12, and a bolt 36 screwed through the front holding wall 11 and the nut 35. Means for connecting the bolt 36 to the operation means 33 is provided with flanges formed on the bolt 36. When the bolts 36, 36 constituting the actuators 34, 34 are rotated to be moved backward from the nuts 35, 35, the movable members 29, 29 turn around the pivot means 32, 32 to move the operation means 33, 33 toward the front holding wall 11 as shown by the arrow M1 in FIG. 11(B). On the contrary, when the bolts 36, 36 constituting the actuators 34, 34 are rotated in counter directions to be moved toward the nuts 35, 35, the movable members 29, 29 turn around the pivot means 32, 32 to move the operation means 33, 33 toward the rear holding wall 12 as shown in the arrow M2 in FIG. 11(C).

The scraper 5 is inserted in the holding channels 31, 31 of the movable members 29, 29 and is held in an arcuately curved configuration. The central portion 5c of the scraper 5 is positioned at the space (C) so that the portion 5c may be resiliently deformable.

According to the fourth embodiment, the scraper 5, which is held in the holding channels 31, 31 within the holding groove 13 and is curved in an arcuate shape having said distance (L), may be transformed its shape to vary the distance (L) without stages between two different distances (L7) and (L8) which are defined under the conditions of L7<L8.

FIG. 11(B) shows the scraper 5 curved in an arcuate shape in which said distance (L7) is selected. When the actuators 34, 34 actuate the movable members 29, 29 to move the operation means 33, 33 in the directions as shown by the arrow M1, the scraper 5 held in the holding channels 31, 31 is transformed to an arch-shaped configuration having said distance (L7) between the central portion and the both side portions thereof. The central portion 5c is transformed between the movable members 29, 29 so as to form an arch shape continuously extending from the holding channels 31, 31 so that the scraper 5 holds an arcuate shape with a radius of curvature Rs7.

FIG. 11(C) shows the scraper 5 curved in an arcuate shape in which said distance (L8) is selected. When the actuators 34, 34 actuate the movable members 29, 29 to move the operation means 33, 33 in the directions as shown by the arrow M2, the scraper 5 held in the holding channels 31, 31 is transformed to an arch-shaped configuration having said distance (L8) between the central portion and the both side portions thereof. The central portion 5c is transformed between the movable members 29, 29 so as to form an arch shape continuously extending from the holding channels 31, 31 so that the scraper 5 holds an arcuate shape with a radius of curvature Rs8.

The actuator 34 comprising the bolt 36 is able to move the operation means 33 without stages so that the scraper 5 is allowed to vary and hold any curved configurations in which the distance (L) is selected within the range between the distances (L7) and (L8).

Fifth Embodiment of Shape Shifting Means

FIG. 12 shows a fifth embodiment of the shape shifting means 20 which allows to transform the scraper 5 into a desired arcuate configuration variably without stages.

The holder 6 provides the holding groove 13 between the front and rear holding walls 11, 12 arranged in parallel in which the front holding wall 11 is curved with a radius of curvature Rw7 and the rear holding wall 12 is curved with a radius of curvature Rw8 of which curves are substantially of concentric circles. The shape shifting means 20 comprises a pair of slidable members 37, 37 which are slidably mounted in the holding groove 13 of the holder 6, while the slidable members 37, 37 are positioned apart from each other to form a space at the central region of the holding groove 13.

The slidable member 37 comprises holding plates 38, 38 curved in parallel, and a holding channel 39 between the plates. The holding plates 38, 38 have outer surfaces which fit the inner curved surfaces of the front and rear holding walls 11, 12 respectively. The slidable members 37, 37 are mounted in the holding groove 13 so as to slide along the holding groove 13 as shown by the arrows in FIG. 12(B) and FIG. 12(C).

The inner surfaces of the holding plates 38, 38 are curved with radiuses of curvature Rw9 and Rw10 respectively of which curves are substantially of concentric circles. Said radiuses Rw9 and Rw10 are shorter than the radiuses of curvature Rw7 and Rw8 of the inner surfaces of the front and rear holding walls 11, 12. The holding channel 39 is formed between the inner surfaces of the holding plates 38, 38.

The slidable members 37, 37 are slided in forward and backward directions by an actuator 41 which is connected to operation means 40 of each slidable member. Although the details are not shown, the actuator 41 may comprise any mechanisms such as turnbuckle mechanism, cylinder mechanism or the like.

The scraper 5 is inserted in the holding channels 39, 39 of the slidable members 37, 37 and is held in an arcuately curved configuration. The central portion 5c of the scraper 5 is positioned at the central region of the holding groove 13 between the slidable members 37, 37 so that the central portion 5c may be resiliently deformable.

According to the fifth embodiment, the scraper 5, which is held in the holding channels 39, 39 within the holding groove 13 and is curved in an arcuate shape having said distance (L), may be transformed its shape to vary the distance (L) without stages between two different distances (L9) and (L10) which are defined under the conditions of L9<L10.

FIG. 12(B) shows the scraper 5 curved in an arcuate shape in which said distance (L9) is selected. When the actuator 41 actuates the slidable members 37, 37 to move in the directions to be apart from each other, the scraper 5 held in the holding channels 39, 39 is transformed to an arch-shaped configuration having said distance (L9) between the central portion and the both side portions thereof. The central portion 5c is transformed between the slidable members 37, 37 so as to form an arch shape continuously extending from the holding channels 39, 39 so that the scraper 5 holds an arcuate shape with a radius of curvature Rs9.

FIG. 12(C) shows the scraper 5 curved in an arcuate shape in which said distance (L10) is selected. When the actuator 41 actuates the slidable members 37, 37 to move in the directions to be close with each other, the scraper 5 held in the holding channels 39, 39 is transformed to an arch-shaped configuration having said distance (L10) between the central portion and the both side portions thereof. The central portion 5c is transformed between the slidable members 37, 37 so as to form an arch shape continuously extending from the holding channels 39, 39 so that the scraper 5 holds an arcuate shape with a radius of curvature Rs10.

The actuator 41 is able to slide the slidable members 37, 37 to a desired position between the position as shown in FIG. 12(B) and the position as shown in FIG. 12(C) without stages so that the scraper 5 is allowed to hold any curved configurations in which the distance (L) is selected within the range between the distances (L9) and (L10).

Effect of the Invention

According to the present invention, the scraper 5, which is held in the holding groove 13 of the holder 6 to be curved in an arcuate configuration having a distance (L) as mentioned above, may be transformed by the shape shifting means 20 so that the scraper 5 keeps a desired configuration selected from among various curved configurations differing said distance (L). Consequently, the scraping portion 7 of the scraper 5 will become in contact with the belt surface over the full width thereof even when the trough-shape of the belt is different than that of expected at a work site. As a result, the leavings on the belt surface are scraped off effectively over full width of the belt surface.

The holding groove 13 of the holder 6 is formed by the rigid holding walls 11, 12 into which the resiliently deformable scraper 5 is held to be curved in an intended arcuate configuration having the desired distance (L) by means of the shape shifting means 20. In this respect, the scraper 5 and the shape shifting means 20 are positioned in the holing groove 13 of the rigid holder 6 so that the scraper 5 is tightened by the shape shifting means 20 within the holder 6 so as to keep its arcuate configuration. Accordingly, the load applied to the scraping portion 7 from the belt surface may be absorbed by the resilient portion between the scraping portion 7 and the leg portion 18a which is held tightly by the shape shifting means 20 along the rigid holder 6. As a result, the scraping portion 7 is prevented from causing vibrations and is made to contact with suitable pressure with the belt surface.

What is claimed is:

1. A belt cleaner for removing the leavings of conveying material on the surface of a conveyor belt during the return movement thereof comprising a scraper (5), a holder (6) holding said scraper and tension means;

said holder (6) providing a pair of holding walls (11, 12) extending in the transverse direction of the belt and a holding groove (13) formed between said walls which is curved gradually from the both side portions to the central portion thereof in the lengthwise direction of the belt, said tension means being disposed for pushing said holder (6) to rotate about an axis (A) extending in the transverse direction of the belt so that said holder (6) is turned upward to its standing position, and said scraper (5) comprising a resilient blade which is yieldingly deformable in such manner as to be curved from the linear state to an arch shape so that said scraper (5) is curved in an arcuate shape to form a distance (L) between the central portion and the both side portions thereof with respect to the lengthwise direction of the belt when said scraper (5) is held in said holding groove (13), characterized in that:

shape shifting means (20) is provided in said holding groove (13) for transforming said scraper (5) into a desired curved configuration selected from among plural curved configurations changing said distance (L) thereby the scraper (5) is held to keep said selected curved configuration;

wherein said front holding wall (11) is curved arcuately with a radius of curvature Rw1 and said rear holding wall (12) is curved arcuately with a radius of curvature Rw2 under the conditions of Rw1>Rw2 so that the width W1 at the central region and the width W2 at the both side regions of said holding groove (13) are formed to be W2>W1 thereby the both side ends of the scraper (5) are allowed to move between the holding walls (11, 12);

wherein said shape shifting means (20) comprises one or more filler plates (21, 21) (26) of flexible material having thick portions (21a) (26a) and a thin portion (21b) (26b) which are inserted between the scraper (5) and one of the holding walls (11, 12) so that said distance (L) of the scraper (5) is allowed to be selected from two different distances (L1 or L3) and (L2 or L4) that are defined under the conditions of L1<L2 and L3<L4 by selecting the positions of the filler plate to be inserted in the holding groove (13), whereby the scraper (5) is curved along the inner surface of the front holding wall (11) and is held in the arcuate configuration having said distance (L1 or L3) when the filler plate is inserted between the scraper (5) and the rear holding wall (12), and the scraper (5) is curved along the inner surface of the rear holding wall (12) and is held in the arcuate configuration having said distance (L2 or L4) when the filler plate is inserted between the scraper (5) and the front holding wall (11).

2. A belt cleaner for removing the leavings of conveying material on the surface of a conveyor belt during the return movement thereof comprising a scraper (5), a holder (6) holding said scraper and tension means;

said holder (6) providing a pair of holding walls (11, 12) extending in the transverse direction of the belt and a holding groove (13) formed between said walls which is curved gradually from the both side portions to the central portion thereof in the lengthwise direction of the belt, said tension means being disposed for pushing said holder (6) to rotate about an axis (A) extending in the transverse direction of the belt so that said holder (6) is turned upward to its standing position, and said scraper (5) comprising a resilient blade which is yieldingly deformable in such manner as to be curved from the linear state to an arch shape so that said scraper (5) is curved in an arcuate shape to form a distance (L) between the central portion and the both side portions thereof with respect to the lengthwise direction of the belt when said scraper (5) is held in said holding groove (13), characterized in that:

shape shifting means (20) is provided in said holding groove (13) for transforming said scraper (5) into a desired curved configuration selected from among plural curved configurations changing said distance (L) thereby the scraper (5) is held to keep said selected curved configuration;

wherein said front holding wall (11) is curved arcuately with a radius of curvature Rw1 and said rear holding wall (12) is curved arcuately with a radius of curvature Rw2 under the conditions of Rw1>Rw2 so that the width W1 at the central region and the width W2 at the both side regions of said holding groove (13) are formed to be W2>W1 thereby the both side ends of the scraper (5) are allowed to move between the holding walls (11, 12);

wherein said shape shifting means (20) comprises a pair of filler plates (27, 27) of flexible material having a thick portion (27a) and a thin portion (27b) respectively which are inserted between the scraper (5) and one of the holding walls (11, 12) so that said distance (L) of the scraper (5) is allowed to be selected from two different distances (L5) and (L6) that are defined under the conditions of L5<L6 by selecting the directions of the filler plates to be inserted in the holding groove (13), whereby the scraper (5) is curved by the filler plates (27, 27) and held in the arcuate configuration having said distance (L5) when the filler plates (27, 27) is inserted in the holding groove (13) in such manner that said thick portions (27a, 27a) are directed to oppose each other, and the scraper (5) is curved by the filler plates (27, 27) and held in the arcuate configuration having said distance (L6) when the filler plates (27, 27) is inserted in the holding groove (13) in such manner that said thin portions (27b, 27b) are directed to oppose each other.

3. A belt cleaner for removing the leavings of conveying material on the surface of a conveyor belt during the return movement thereof comprising a scraper (5), a holder (6) holding said scraper and tension means;

said holder (6) providing a pair of holding walls (11, 12) extending in the transverse direction of the belt and a holding groove (13) formed between said walls which is curved gradually from the both side portions to the central portion thereof in the lengthwise direction of the belt, said tension means being disposed for pushing said holder (6) to rotate about an axis (A) extending in the transverse direction of the belt so that said holder (6) is turned upward to its standing position, and said scraper (5) comprising a resilient blade which is yieldingly deformable in such manner as to be curved from the linear state to an arch shape so that said scraper (5) is curved in an arcuate shape to form a distance (L) between the central portion and the both side portions thereof with respect to the lengthwise direction of the belt when said scraper 5) is held in said holding groove (13), characterized in that:

shape shifting means (20) is provided in said holding groove (13) for transforming said scraper (5) into a desired curved configuration selected from among plural curved configurations changing said distance (L) thereby the scraper (5) is held to keep said selected curved configuration;

wherein said shape shifting means (20) comprises a pair of movable members (29, 29) movably mounted in the holding groove (13) of the holder (6), and one or more actuators (34) to move said movable members, wherein each movable member (29) has a holding channel (31) formed in an arcuate shape for holding the scraper (5) and providing one end thereof with pivot means (32) and the other end thereof with operation means (33) connected to said actuator, and said movable members (29, 29) are pivoted via said pivot means (32) at the central region of the holding groove (13) of the holder (6) in such manner as to form a space (C) therebetween so that said distance (L) of the scraper (5) inserted in said holding channels (31, 31) is allowed to be varied in the range between different distances (L7) and (L8) that are defined under the conditions of L7<L8 by moving said movable members (29, 29), whereby the scraper (5) is curved and held in the arcuate configuration having said distance (L7) when the operation means (33, 33) of the movable members (29, 29) are moved by the actuator (34) toward the front holding wall (11), and the scraper (5) is curved and held in the arcuate configuration having said distance (L8) when the operation means (33, 33) of the movable members (29, 29) are moved by the actuator (34) toward the rear holding wall (12).

4. A belt cleaner for removing the leavings of conveying material on the surface of a conveyor belt during the return movement thereof comprising a scraper (5), a holder (6) holding said scraper and tension means;

said holder (6) providing a pair of holding walls (11, 12) extending in the transverse direction of the belt and a holding groove (13) formed between said walls which is curved gradually from the both side portions to the central portion thereof in the lengthwise direction of the belt, said tension means being disposed for pushing said holder (6) to rotate about an axis (A) extending in the transverse direction of the belt so that said holder (6) is turned upward to its standing position, and said scraper (5) comprising a resilient blade which is yieldingly deformable in such manner as to be curved from the linear state to an arch shape so that said scraper (5) is curved in an arcuate shape to form a distance (L) between the central portion and the both side portions thereof with respect to the lengthwise direction of the belt when said scraper (5) is held in said holding groove (13)

characterized in that:

shape shifting means (20) is provided in said holding groove (13) for transforming said scraper (5) into a desired curved configuration selected from among plural curved configurations changing said distance (L) thereby the scraper (5) is held to keep said selected curved configuration;

wherein said shape shifting means (20) comprises a pair of slidable members (37, 37) slidably mounted in the holding groove (13) of the holder (6) in such manner as to form a space therebetween, and one or more actuators (41) to slide said slidable members, and said slidable members (37, 37) provide holding channels (39, 39) formed in an arcuate shape for holding the scraper (5) and said slidable members (37, 37) are slided by the actuator (41) in forward and backward directions along the holding groove (13) so that said distance (L) of the scraper (5) inserted in said holding channels (39, 39) is allowed to be varied in the range between different distances (L9) and (L10) that are defined under the conditions of L9<L10 by sliding said slidable members (37, 37), whereby the scraper (5) is curved and held in the arcuate configuration having said distance (L9) when the slidable members (37, 37) are slided to be close with each other, and the scraper (5) is curved and held in the arcuate configuration having said distance (L10) when the slidable members (37, 37) are slid to be apart from each other.

* * * * *